United States Patent

Volkmer et al.

[11] Patent Number: 6,149,295
[45] Date of Patent: Nov. 21, 2000

[54] MEASUREMENT OF PARAMETERS IN REACTORS HAVING MOVING STIRRERS

[75] Inventors: Dieter Volkmer, Schifferstadt; Peter Schey, Ludwigshafen; Herbert Plötz, Schifferstadt; Franz Langhauser, Ruppertsberg; Dirk Meckelnburg, Ludwigshafen; Hans-Josef Klein, Marpingen; Michael Bergner, Freinsheim; Jürgen Oelze, Ludwigshafen, all of Germany

[73] Assignee: BASF Aktiengesellschaft, Ludwigshafen, Germany

[21] Appl. No.: 09/400,844

[22] Filed: Sep. 21, 1999

[30] Foreign Application Priority Data

Sep. 24, 1998 [DE] Germany .................. 198 43 689

[51] Int. Cl.[7] .................. B01F 15/00; G01D 21/00
[52] U.S. Cl. .................. 366/142; 366/343; 73/866.5
[58] Field of Search .................. 366/142, 143, 366/144, 145, 241, 279, 342, 343, 349; 73/863.91, 866.5

[56] References Cited

U.S. PATENT DOCUMENTS

| | | | |
|---|---|---|---|
| 4,042,219 | 8/1977 | Terry | 366/142 |
| 4,599,933 | 7/1986 | Knauss | 73/866.5 |
| 4,715,723 | 12/1987 | Anderson et al. | 366/142 |
| 5,589,649 | 12/1996 | Brinker et al. | 366/343 |
| 5,661,251 | 8/1997 | Cummings et al. | 73/866.5 |

*Primary Examiner*—Tony G. Soohoo
*Attorney, Agent, or Firm*—Keil & Weinkauf

[57] ABSTRACT

A process and apparatus for the measurement of parameters in reactors having moving stirrers which contain probes in the reactor interior, wherein at least two probes connected via a multiplexer to a sensor signal amplifier by connecting cables located in the moving stirrers are installed on the surface of the moving stirrers, and the measurement data obtained by the probes are passed via the connecting cables to a sensor signal amplifier and from thence are passed on to an electronic evaluation unit by non-contact, inductive signal transmission by means of a contactless sensor tap.

12 Claims, 3 Drawing Sheets

MEASUREMENT OF PARAMETERS IN REACTORS HAVING MOVING STIRRERS

BACKGROUND OF THE INVENTION

The present invention relates to a process for the measurement of parameters in reactors having moving stirrers which contain probes in the reactor interior, wherein at least two probes connected to a sensor signal amplifier by connecting cables located in the moving stirrers are installed on the surface of the moving stirrers, and the measurement data obtained by the probes are passed via the connecting cables to a sensor signal amplifier and from thence are passed on to an electronic evaluation unit by non-contact, inductive signal transmission by means of a contactless sensor tap.

The present invention furthermore relates to a device for the measurement of parameters in reactors having moving stirrers.

For reaction control and monitoring, temperature probes and occasionally also pressure probes are frequently installed at a wide variety of points in chemical reactors. This is particularly necessary in polymerization reactors, since the heat of reaction generated therein by the polymerization must be rapidly dissipated again, making it necessary to determine the change in pressure and temperature in the polymerization reactor as accurately as possible. The temperature probes used are usually thermocouples fed into the interior of the reactor through the reactor wall or via a dip tube.

In numerous polymerization reactors, use is frequently made of moving stirrers in the reactor interior for keeping the reaction bed, which is frequently pulverulent, in motion. For such purposes, vertical, self-supporting helical stirrers are particularly suitable; these are disclosed, inter alia, in EP-B 000 512, EP-B 031 417 and EP-B 038 478. During operation, the self-supporting helical stirrers convey the powder bed present in the reactors toward the top.

In reactors having stirrers in their interior, the problem frequently arises that it has hitherto not been possible to install pressure or temperature probes in the actual working area of the stirrer, i.e. at the point in the interior where the greatest mixing of the reactor contents takes place and the main energy input by the stirrer occurs, since the movement of the stirrer prevents this. For this reason, the pressure and temperature probes have hitherto either only been attached to the reactor wall or only installed in the interior of the stirrer by introduction of a dip tube. Installation of, for example, a plurality of probes at different points of the reactor allows temperature or pressure distributions in the reactor interior to be determined, but this does not usually allow reliable information to be obtained on the parameter distribution in the actual working area of the stirrer since no corresponding probes are present there.

Neither has it hitherto been possible in the reactors described in EP-B 000 512, EP-B 031 417 and EP-B 038 478 to determine pressure or temperature distributions in the actual working area of the self-supporting helical stirrer, since conventional probes cannot be installed there owing to the specific geometry of the self-supporting helical stirrer. In such reactors, the pressure or temperature measurement is effected by conventional probes installed on the reactor wall or else in the free interior of the helical stirrer within dip tubes formed therein. However, the resultant pressure or temperature distributions do not give a reliable picture of the pressure or temperature conditions prevailing in the actual working area of the self-supporting helical stirrer, i.e. between the wall region of the reactor on the one hand and the helical stirrer's free interior provided with dip tubes on the other hand.

SUMMARY OF THE INVENTION

It is an object of the present invention to remedy the abovementioned disadvantages and to develop a simple process for the measurement of parameters in reactors having moving stirrers which enables pressure or temperature distributions to be determined even in the working area of the moving stirrer, i.e. at the point in the interior of the reactor where the greatest mixing of the reactor contents takes place and the greatest energy input by the stirrer occurs. The object of the present invention also extends to the development of a device which is suitable for such parameter measurements.

We have found that this object is achieved by a novel process for the measurement of parameters in reactors having moving stirrers which contain probes in the reactor interior, wherein at least two probes connected to a sensor signal amplifier by connecting cables located in the moving stirrers are installed on the surface of the moving stirrers, and the measurement data obtained by the probes are passed via the connecting cables to a sensor signal amplifier and from thence are passed on to an electronic evaluation unit by non-contact, inductive signal transmission by means of a contactless sensor tap.

The novel process is suitable for the measurement of parameters in reactors having moving stirrers which contain probes in their interior. Such reactors are the usual reactors containing moving stirrers that are used in chemical technology, the novel process being particularly applicable to polymerization reactors.

The term "moving stirrer" is taken to mean principally disk agitators, blade stirrers, anchor stirrers, symmetrical and asymmetrical impeller stirrers and self-supporting helical stirrers, which are preferred in polymerization reactors.

Such helical stirrers are disclosed, inter alia, in EP-B 000 512 and consist of a hub installed in the center of the lower part of the reactor, and the spiral, upward-screw helical stirrer attached to the hub. The helical stirrer usually consists of steel and does not have an axis in the center, i.e. above the hub, i.e. is self-supporting.

The self-supporting helical stirrer has from about 4 to 10, in particular from about 4 to 6, turns before it reaches the upper region of the reactor.

In accordance with the novel process, at least two, preferably at least 9, in particular at least 12, probes are attached to the surface of the moving stirrer. Preferred probes are, inter alia, platinum resistance thermometers and thermocouples owing to their extremely low-mass design.

The novel process uses, in particular, platinum resistance thermometers owing to their high measurement accuracy. Besides temperature probes, pressure probes, in particular, can be used.

In a preferred embodiment of the novel process, the probes, i.e. the pressure or temperature probes, are installed on the upper side of the stirrer profile flush with the surface. In order to measure exclusively the parameters prevailing in the reaction space, it is advantageous to insulate the probes thermally from the highly thermoconductive stirrer helix by embedding the latter in plastic bushes, the plastic used having less than 1% of the thermoconductivity of the steel forming the stirrer helix. Plastics which are suitable for this purpose include polyether ether ketone, polytetrafluoroethylene and polyvinylidene fluoride, preference being given to polyether ether ketone owing to its material properties, in particular owing to its high mechanical, electrical and chemical resistance. Particularly suitable polyether ether ketones are the polyaryl ether ketones obtainable from hydroquinone and 4,4'-difluorobenzophenone by nucleophilic substitution.

The pressure or temperature probes used in the novel process are connected from their respective installation site to a sensor signal amplifier via conventional connecting cables located in the moving stirrer. Sensor signal amplifiers are electronic units which convert the measurements from a variety of sensors into a high-frequency signal, which is then passed on to an appropriate evaluation unit by non-contact, inductive transmission. The measurements obtained from the sensors can relate to the pressure, the temperature, the torque, path travelled or force.

It may be advisable additionally to install a so-called multiplexer, i.e. a signal amplifier, between the pressure or temperature probes on the one hand and the sensor signal amplifier on the other hand. One of the jobs of a multiplexer is to interrogate connected sensors for their measurements and then to pass the respective measurements on to the sensor signal amplifier.

The measurement data obtained at the pressure or temperature probes in the novel process, which are fed to a sensor signal amplifier via connecting cables, are passed on therefrom to an electronic evaluation unit by non-contact, inductive signal transmission by means of a contactless sensor tap.

The term "contactless sensor tap" is taken to mean access to the measurement data from the sensor without contact, with no electrical or mechanical connection to the sensor, for example via corresponding slip rings.

Examples of suitable evaluation units include single- or multichannel receivers for corresponding process parameters, such as pressure or temperature.

In reactors having self-supporting helical stirrers, it may also be advisable to configure the novel process in such a way that the measurement data entering the sensor signal amplifier are transmitted via a coaxial cable to an encapsulated rotor antenna, from where they are then transmitted, by non-contact, inductive signal transmission, to an encapsulated stator antenna located in a central dip tube in the center of the self-supporting helical stirrer, the measurement data subsequently being passed on from the encapsulated stator antenna to the electronic evaluation unit via a further coaxial cable.

A coaxial cable contains a central cable surrounded by a suitable insulation. The insulation is in turn surrounded by cylindrical screening of conductive fabric. The cylindrical screening is likewise embedded in a further insulation, which represents the outer cladding of the coaxial cable.

An encapsulated rotor antenna is a metal loop with coaxial cables as well as terminating capacitors soldered to its open ends. The metal loop, the capacitors and the coaxial cables are located in an appropriately shaped antenna support and are embedded in a suitable encapsulating compound.

Like rotor antennas, stator antennas can also be appropriately encapsulated, i.e. embedded in a suitable encapsulating compound.

The term "non-contact, inductive signal transmission" is taken to mean transmission of measurement signals from one component to another, one of the two components or even both being movable. The movement can be either a symmetrical or an asymmetrical rotary movement. In any case, the measurement signals are not transmitted by mechanical or electromechanical coupling, but instead via two inductively coupled loops (antennae). The coupling is effected on the principle of a transformer, in this case iron-free. A high-frequency electromagnetic field transmits electrical energy from the receiving antenna to a transmitting antenna. The sensor signal amplifier is fed therewith, putting it in a position to transmit the measurement data from the sensor to the receiving antenna via the transmitting antenna.

It may furthermore be advisable to effect the voltage supply required for the pressure or temperature measurement via the encapsulated rotor and rod antennae, likewise inductively.

The novel process is especially suitable for reactors operated at a pressure in the range from 0 to 100 bar and at a temperature in the range from −40 to +150° C.

If the reactors are polymerization reactors, preference is given to those operated at a pressure in the range from 10 to 50 bar, in particular from 12 to 40 bar, and at a temperature in the range from −40 to +150° C., preferably from −40 to +125° C., in particular from −25 to +100° C.

The likewise novel device for determining parameters in reactors having moving stirrers contains probes in the reactor interior, at least two probes connected to a sensor signal amplifier by connecting cables located in the moving stirrer being installed on the surface of the moving stirrer, the amplifier being in turn connected to an electronic evaluation unit via a contactless sensor tap.

The probes here can be either temperature probes or pressure probes attached to the surface of the moving stirrer. Regarding the individual embodiments of the likewise novel device, reference is made to the description of the novel process.

The novel process is suitable for the measurement of parameters, i.e. for the measurement of pressure and temperature, in reactors having moving stirrers, in particular in their working area, which was hitherto only accessible to such measurements to an unsatisfactory extent. The novel process and the novel device are simple and enable precise determination of parameters, even in explosion-risk areas.

BRIEF DESCRIPTION OF THE DRAWINGS

An illustrative embodiment of the novel process with reference to a self-supporting helical stirrer is described in greater detail below and is shown diagrammatically in the following drawings (FIGS. 1 to 3), in which.

DETAILED DESCRIPTION

Figure 1:
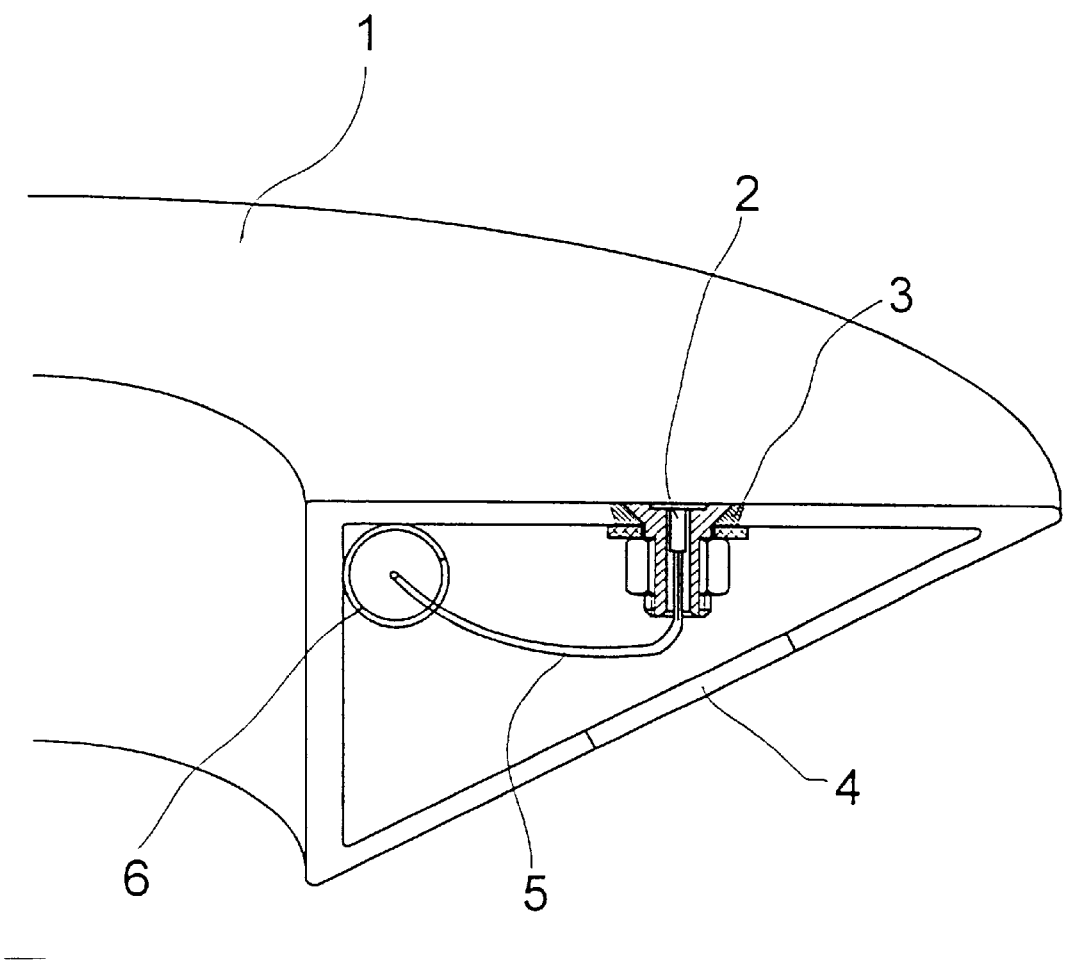
FIG. 1 shows a temperature probe in the helix profile of a self-supporting helical stirrer.

Description of FIG. 1:

FIG. 1 shows a temperature probe in a helical stirrer profile (1). A temperature probe (2) embedded in a plastic bush (3) for insulation is located on the surface of the helical stirrer profile. An installation opening (4) for installation of the temperature probe (2) is furthermore formed on the lower edge of the helical stirrer profile (1). Measurement lines (5) lead from the sensor amplifier to the temperature probe (2) via a guide tube (6). The temperature probe (2) is a platinum resistance thermometer of the Pt 100 type designed as a sliding mount thermometer installed in a specially made metallic countersunk head bolt (right-handed thread). This bolt is in turn located, with thermal insulation, in a conical plastic ring (left-handed thread) matched to the countersinking, in a countersunk hole in the product-transporting surface of the helical stirrer profile (1). The entire arrangement is surface-flush. It is attached by means of a nut through an opening in the underside of the profile, thermally insulated by a plastic washer. The plastic selected is polyether ether ketone, a material having positive properties for this area of application. This probe design guarantees that it is not the stirrer temperature but exclusively the product temperature that is measured.

Figure 2:
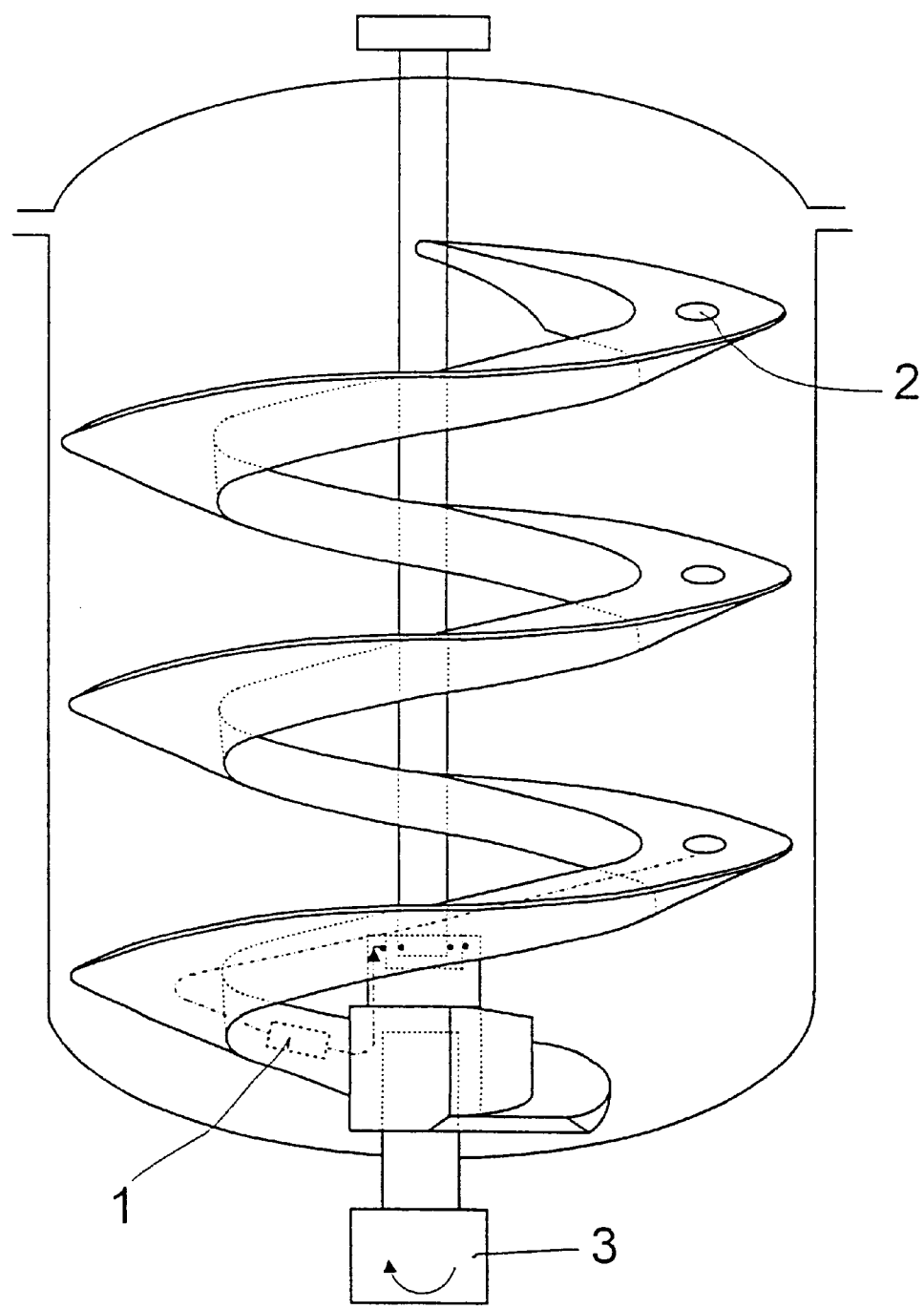
FIG. 2 shows a helical stirrer with a novel device for temperature measurement installed in a stirred reactor.

Description of FIG. 2:

FIG. 2 shows the entire reactor in which the helical stirrer with temperature device is located. The helical stirrer is kept in motion by a stirrer motor (3) arranged beneath it. Temperature probes (2) and sensor amplifiers (1) are attached to the helical stirrer. Cables branch off from the temperature probes (2) to the signal transmission electronics, here referred to as sensor amplifier. These electronics contain a multiplexer as input stage, which has the task of interrogating all the connected sensors one after the other for the value of the measurement parameter and of passing the respective value on to the sensor signal amplifier. The measurement values prepared by this amplifier are fed to the rotor antenna via a coaxial cable, transmitted to the stator antenna and then passed on to the evaluation unit via a coaxial cable.

Figure 3:
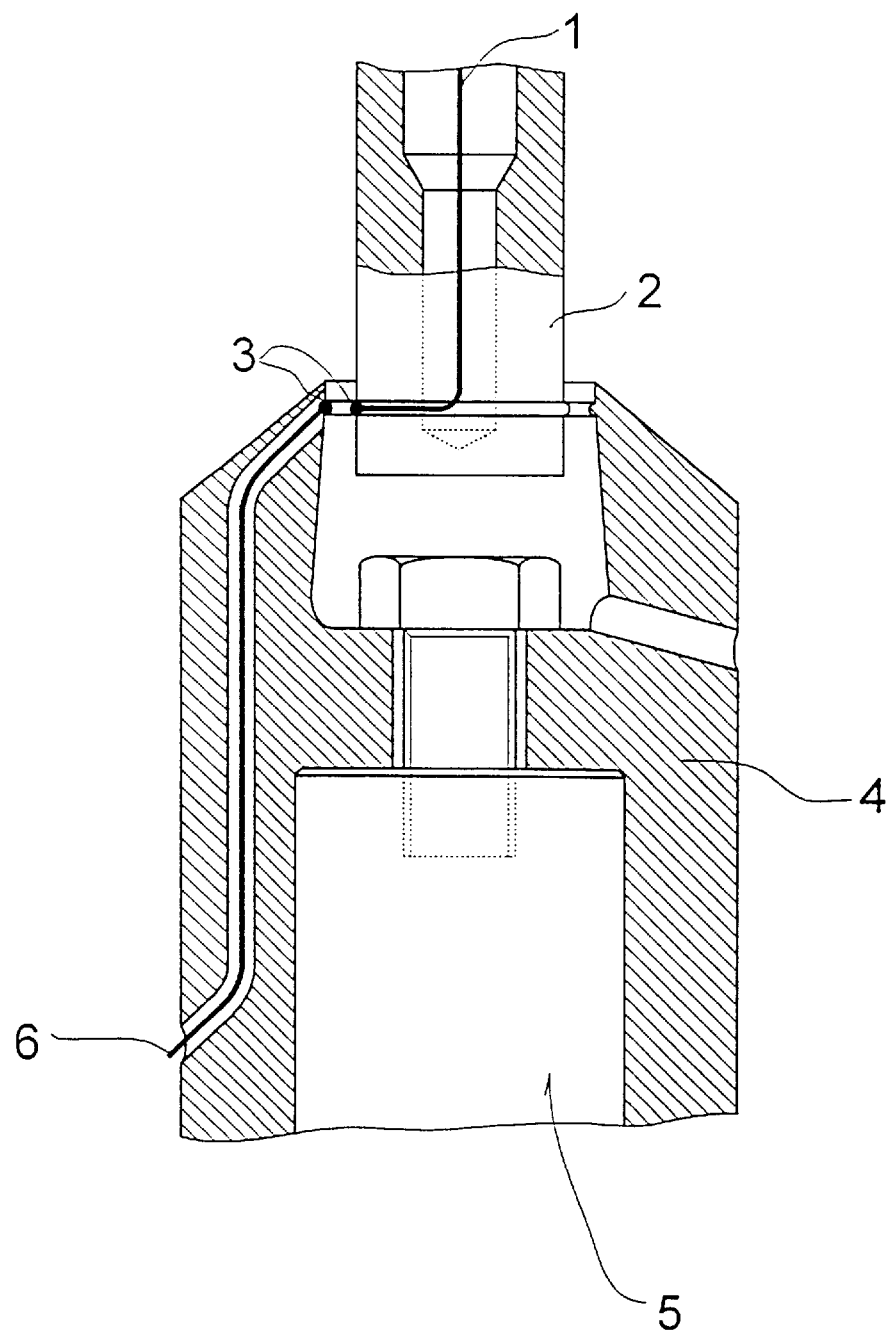
FIG. 3 shows the lower part of the helical stirrer with the hub and contactless sensor tap.

Description of FIG. 3:

FIG. 3 shows the lower part of the helical stirrer with the stirrer hub (4) and contactless sensor tap. At the top is the data transmission cable (1), embedded in a free-standing tube (2) in the reactor center, which cable leads to the evaluation electronics. The data transmission cable is connected to antennae (3). FIG. 3 also shows data transmission cables (6) which lead to the sensor amplifier and a stirring shaft (5) from the lower reactor drive. FIG. 3 shows the principle of construction of the non-contact, inductive signal transmission. The two antennae in the stirrer hub (rotor) and in the central tube (stator) are arranged concentrically on a plane. The antenna support on the hub widens conically in a downward direction, so that product penetrating between the stator and rotor is not trapped there but returned to the product circuit through lateral dip tubes. Both antenna supports, like the sensor mounts, are made of polyether ether ketone.

A plurality of temperature measurement points are installed on the stirrer helix (FIG. 2). For reasons of measurement accuracy, Pt 100 (platinum resistance thermometers) are used. These Pt 100 are installed on the upper side of the stirrer profile (FIG. 1) flush with the surface. In order to measure exclusively the product temperature, the Pt 100 are thermally insulated from the readily thermoconductive stirrer helix by mounting them in plastic bushes having a thermal conductivity value of less than 1% of that of the stirrer helix steel. From each installation site, the Pt 100 connecting cables are drawn into a guide tube (FIG. 1) extending to the lower end of the stirrer helix, where—within the stirrer helix profile—a closed housing is located in which the rotor electronics are accommodated. These are composed of a multiplexer, to which the Pt 100 is connected, and the sensor signal amplifier. The amplifier output is connected via a coaxial cable to the rotor antenna, which is located in a plastic part attached to the stirrer hub. The data are transmitted from here to the stator antenna. This is located concentrically to the rotor antenna and on its plane, likewise embedded in a plastic part, which is installed at the lower end of the central dip tube (FIG. 3). The stator antenna is connected via a coaxial cable to the evaluation unit, where the data are converted into standard signals.

We claim:

1. A process for the measurement of parameters in reactors having moving stirrers which contain probes in the reactor interior, wherein at least two probes connected to a sensor signal amplifier by connecting cables located in the moving stirrers are installed on the surface of the moving stirrers, and the measurement data obtained by the probes are passed via the connecting cables to a sensor signal amplifier and from thence are passed on to an electronic evaluation unit by non-contact, inductive signal transmission by means of a contactless sensor tap.

2. A process as claimed in claim 1, wherein the probes used are pressure probes.

3. A process as claimed in claim 1, wherein the probes used are temperature probes.

4. A process as claimed in claim 1, wherein the probes arranged on the surface of the moving stirrer are thermally insulated from the highly thermoconductive moving stirrer by being embedded in plastic bushes, the plastic used having less than 1% of the thermoconductivity of the steel forming the stirrer helix.

5. A process as claimed in claim 1, wherein the moving stirrer used is a self-supporting helical stirrer.

6. A process as claimed in claim 5, wherein the measurement data entering the sensor signal amplifier are transmitted via a coaxial cable to an encapsulated rotor antenna, from where they are then transmitted, by non-contact, inductive signal transmission, to an encapsulated stator antenna located in a central dip tube in the center of the self-supporting helical stirrer, the measurement data subsequently being passed on from the encapsulated stator antenna to the electronic evaluation unit via a further coaxial cable.

7. A process as claimed in claim 5, wherein the voltage supply required for the parameter measurement is simultaneously effected via the encapsulated rotor and stator antennae, likewise inductively.

8. A process as claimed in claim 1, wherein the reactor is operated at a pressure in the range from 0 to 100 bar and at a temperature in the range from −40 to +150° C.

9. A process as claimed in claim 8, wherein the reactor is a polymerization reactor operated at a pressure in the range from 10 to 50 bar at a temperature in the range from 40 to +150° C.

10. A device for determining parameters in reactors having moving stirrers which contain probes in the reactor interior, at least two probes connected to a sensor signal amplifier by connecting cables located in the moving stirrer being installed on the surface of the moving stirrer, the amplifier being in turn connected to an electronic evaluation unit via a contactless sensor tap.

11. A device as claimed in claim 10, in which temperature probes are installed on the surface of the moving stirrer.

12. A device as claimed in claim 10, in which pressure probes are installed on the surface of the moving stirrer.

* * * * *